(12) United States Patent
Gustafsson

(10) Patent No.: US 10,370,969 B2
(45) Date of Patent: Aug. 6, 2019

(54) ARRANGEMENT FOR ROCK BOLTS AND A METHOD FOR THE USE OF THE ARRANGEMENT, AND A REINFORCEMENT SYSTEM COMPRISING SUCH AN ARRANGEMENT

(71) Applicant: Rock Safety Sweden AB, Luleå (SE)

(72) Inventor: Leif Gustafsson, Luleå (SE)

(73) Assignee: Rock Safety Sweden AB, Luleå (SE)

( * ) Notice: Subject to any disclaimer, the term of this patent is extended or adjusted under 35 U.S.C. 154(b) by 0 days.

(21) Appl. No.: 15/526,705

(22) PCT Filed: Nov. 13, 2015

(86) PCT No.: PCT/SE2015/051215
§ 371 (c)(1),
(2) Date: May 12, 2017

(87) PCT Pub. No.: WO2016/076788
PCT Pub. Date: May 19, 2016

(65) Prior Publication Data
US 2017/0321552 A1    Nov. 9, 2017

(30) Foreign Application Priority Data
Nov. 13, 2014  (SE) ...................................... 1451357

(51) Int. Cl.
*E21D 21/02*    (2006.01)
*G01L 5/00*    (2006.01)
(Continued)

(52) U.S. Cl.
CPC ............. *E21D 21/02* (2013.01); *E21D 20/02* (2013.01); *G01L 5/0004* (2013.01); *G08B 5/36* (2013.01)

(58) Field of Classification Search
CPC ......... E21D 21/02; E21D 20/00; E21D 20/02; G01L 5/0004; G01L 5/101; G01L 5/102; G08B 5/36
(Continued)

(56) References Cited

U.S. PATENT DOCUMENTS 5,430,953 A * 7/1995 de Souza ................. G01B 5/30
  33/1 PT
5,929,341 A * 7/1999 Bawden .................. E21D 21/02
  73/152.59
(Continued)

FOREIGN PATENT DOCUMENTS

AU    2009216197    *  8/2009
CN    103470287 A    12/2013
(Continued)

OTHER PUBLICATIONS

International Search Report and Written Opinion for PCT/SE2015/051215, dated Feb. 11, 2016.
(Continued)

*Primary Examiner* — Carib A Oquendo
(74) *Attorney, Agent, or Firm* — Marshall, Gerstein & Borun LLP

(57) ABSTRACT

An arrangement for a rock bolt that is intended to be embedded in grout in a borehole, a method for using said arrangement, and a reinforcement system including such an arrangement. The rock bolt is equipped with a longitudinal tube with a passage, wherein an extended electrically conducting sensor is introduced into the passage of the tube and the sensor is connected with the anchoring end of the rock bolt, a monitoring arrangement designed to be connected to the rock bolt, an electrically conducting circuit is formed through the connection of the rock bolt, the sensor and the monitoring arrangement, wherein the monitoring arrangement includes evaluation means intended to evaluate the
(Continued)

presence of changes in the condition of the bolt, and signaling means designed for the signaling of the condition of the bolt.

21 Claims, 6 Drawing Sheets

(51) Int. Cl.
  *E21D 20/02* (2006.01)
  *G08B 5/36* (2006.01)
(58) Field of Classification Search
  USPC ........... 405/259.1, 259.5; 73/152.59, 152.51, 73/784
  See application file for complete search history.

(56) References Cited

U.S. PATENT DOCUMENTS

| | | | |
|---|---|---|---|
| 6,311,564 B1* | 11/2001 | Martin | G01B 7/18 73/787 |
| 2005/0011265 A1* | 1/2005 | Brink | E21D 20/02 73/588 |
| 2005/0231377 A1* | 10/2005 | Sunderman | E21D 21/02 340/665 |
| 2008/0085161 A1* | 4/2008 | Oberg | E21D 20/00 405/259.1 |
| 2011/0070035 A1* | 3/2011 | Ricardo | E21D 20/02 405/259.5 |
| 2012/0048009 A1 | 3/2012 | Berg et al. | |
| 2012/0251262 A1* | 10/2012 | Hidalgo Salgado | F16B 13/066 411/15 |

FOREIGN PATENT DOCUMENTS

| | | | | |
|---|---|---|---|---|
| GB | 1025728 A | | 4/1966 | |
| GB | 2199952 | * | 7/1988 | |
| JP | 2001318011 | * | 11/2001 | |
| JP | 2001318011 A | | 11/2001 | |
| JP | 2006250647 | * | 9/2006 | |
| RU | 533769 | | 12/2010 | |
| WO | WO 2009/104687 | * | 2/2009 | ............. E21D 21/02 |
| WO | WO-2010128943 A1 | | 11/2010 | |
| WO | WO-2014133449 A1 | | 9/2014 | |

OTHER PUBLICATIONS

Extended European Search Report for PCT/SE2015051215 dated Jun. 12, 2018.

* cited by examiner

ARRANGEMENT FOR ROCK BOLTS AND A METHOD FOR THE USE OF THE ARRANGEMENT, AND A REINFORCEMENT SYSTEM COMPRISING SUCH AN ARRANGEMENT

The invention concerns an arrangement for a rock bolt of the type, a method for the use of the arrangement, and a reinforcement system comprising the said arrangement.

BACKGROUND

Bolting is the most common reinforcement of rock that is exposed to slow deformation or sudden fracture. Fundamental requirements for rock bolts are that they are to support a heavy load and to resist a large degree of strain/elongation before the bolt breaks. A large number of rock bolts introduced into boreholes and anchored in them by means of embedding in grout form together a reinforcement system that stabilizes and reinforces the rock structure during the building of tunnels, mining operations, tunneling, etc.

Several different types of bolt intended for such reinforcement systems are available. One example of a bolt for embedding in a reinforcement system is the one known as the "Kiruna bolt" or a ribbed rock bolt that consists of a rod of solid steel. Bolts of this type normally have at their forward end an anchor arrangement such as a wedge for mechanical anchoring at the bottom of the borehole, and the bolt is provided at the end that is closest to the opening of the borehole with threads for the reception of a mounting fitting, normally in the form of a washer and nut, that is placed in contact with the area of rock material that surrounds the opening of the borehole. This type of rock reinforcement system achieves its principal load-bearing ability through the adhesion along the complete length of the rock bolt that the grout gives rise to. Other types of rock bolt are also available, such as dynamic rock bolts, that differ from the ribbed rock bolt through their being provided along a central part with a sheath or similar, whereby the embedding of the bolt takes place principally along two anchoring zones, partly along a forward section of the bolt at the bottom of the borehole and partly along a section of bolt closest to the opening of the borehole.

A further type of rock bolt is a cable bolt or a wire bolt that consists of seven twisted steel threads. All of these types of bolt may be 3-10 m in length and are intended for embedding in grout.

One problem with rock reinforcement systems that consist of embedded rock bolts is that unknown fractures and natural cavities are sometimes present, which are filled by that portion of the grout that is injected into the borehole, whereby the rock bolt that is subsequently introduced into it will be insufficient embedded in the borehole, which may have the consequence that the reinforcement system is deficient and achieves a reduced load-bearing ability.

A further problem is that rock reinforcement systems that are used in fracture-rich rock are subject to heavy loads. The rock bolts may be placed under load locally at locations at which they cross large fractures between blocks, and thus subject to heavy loads that lead to the bolts becoming deformed, mainly through strain and extension. In certain cases the load exceeds the ability of the rock bolt to absorb force, such that breaks of the rock bolt arise, whereby the reinforcement system is weakened.

It is therefore important to ensure that reinforcement systems of this type truly satisfy the stringent safety requirements, both initially and in the long term.

One effective method of detecting directly the presence of a cavity in a borehole with embedded bolts is revealed by the document SE 533769. This method makes it possible to detect whether any cavities remain shortly after that hardening grout and the rock bolt have been introduced into the borehole.

SE 533769 reveals a reinforcement means, a rock bolt, that has a tube with a passage for the introduction of a medium into the borehole. The wall of the tube is equipped with radially directed holes, openings. During the use of the method and system according to SE 533769, the rock bolt is introduced into a borehole shortly after the borehole has been filled with unhardened filler material. The presence of a cavity in connection with the rock bolt is investigated by supplying a medium under pressure to the borehole through the tube. In such a case, the medium flows through the holes, the openings, to the cavity on the outer surface of the tube. This results in a measurable change in pressure that indicates that a cavity is present in connection with the rock bolt, which gives a direct indication of the initial load-bearing ability of the bolt. However, since the rock structure, and in particular rock structures that are rich in fractures, can change with time, it is of the highest importance to obtain information about the status of the bolt also after a period of time. There is, therefore, a need to be able to evaluate and monitor in a simple and reliable manner the condition of the rock bolt and its load-bearing ability at regular intervals and during a long period.

SUMMARY OF THE INVENTION

One purpose of the present invention, therefore, is to achieve an arrangement and a method for the detection of the condition of rock bolts that are embedded in a borehole.

This purpose of the invention is solved through an arrangement with the distinctive features described herein and a method with the distinctive features described herein, together with a reinforcement system comprising the said arrangement.

According to the invention, the arrangement is intended for a rock bolt that is to be embedded in grout in a borehole where the rock bolt is equipped with a longitudinal tube with a passage. According to the invention, an extended electrically conducting sensor is introduced into the passage of the tube, whereby the sensor is connected to the forward end of the rock bolt. The arrangement comprises further a monitoring arrangement designed to be mounted at the end of the rock bolt that extends out of the borehole after the embedding has been carried out, that an electrically conducting circuit is formed through the connection of the rock bolt, the sensor and the monitoring arrangement. The arrangement further comprises that the monitoring arrangement demonstrates evaluation means intended to evaluate the presence of changes in the condition of the bolt, and signalling means to signal the condition of the rock bolt.

The arrangement according to the invention detects and indicates the condition, the status, at an embedded rock bolt, and changes in the condition, the status, of the rock bolt such as strain and breakage.

The sensor is arranged to follow the extension and straining of the rock bolt. The monitoring arrangement and the sensor are designed such that the sensor can be displaced a certain amount, and it is in this way possible also to determine the degree of straining e of the bolt. The monitoring arrangement in this way shows whether the bolt has been bent and weakened and has a reduced load-bearing ability.

By checking that the electrical circuit consisting of the rock bolt, the sensor and the monitoring arrangement is closed, it is possible to evaluate in a simple manner whether a rock bolt is whole or has been subject to breakage. When the circuit is open, this is detected by the monitoring arrangement that signals that the bolt has broken.

A further advantage of the arrangement according to the invention is that if the bolt is influenced by transverse forces through displacement of the rock material and the bolt breaks as a consequence of shearing, it is possible to determine the location of the break, since in such a case the sensor will also break in the same region. The position of the break can then be determined through removing the sensor from the tube and measuring the length of the sensor that has been removed.

In one embodiment the monitoring arrangement is equipped with communication means for wireless network communication (WiFi) or radio communication over mobile phone networks for the transmission and possibly also the reception of information with respect to status and/or change of status of the rock bolt, its straining, the extent of the extension, etc. This is advantageous, since the information can be presented on a central presentation unit that is located remotely from the rock bolt.

It is advantageous to equip a fraction of the bolts in a reinforcement system with the arrangement according to the invention. Through central monitoring using wireless network communication between each individual bolt equipped with an evaluation unit and with a central presentation unit, considerably improved possibilities for the surveillance and monitoring of the complete reinforcement system in tunnels and mines are achieved.

In one embodiment of the invention, the tube that is attached at the rock bolt is equipped with openings, slits, along the wall of the tube. The tube can then be used also for the direct investigation of the presence of cavities during an initial phase, immediately after the embedding. The tube can in this way be used for two purposes, namely evaluation of the load-bearing ability of each individual bolt both initially and in the long term.

DESCRIPTION OF DRAWINGS

The invention will be described in more detail below with reference to the attached drawings and the subsequent description of an embodiment of the invention, in which.

DESCRIPTION OF EMBODIMENTS

Figure 1:
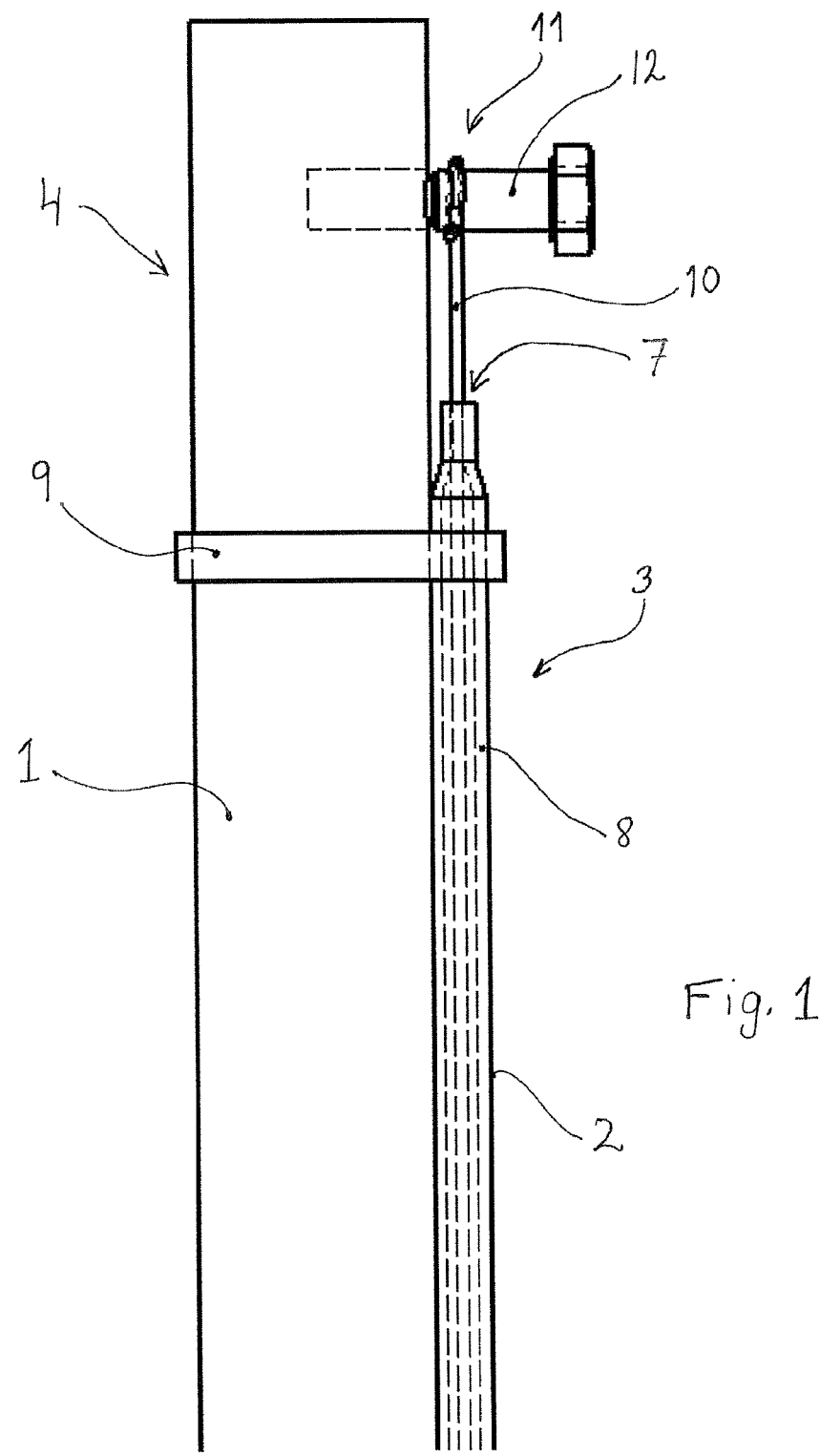
FIG. 1 shows schematically the forward end of a rock bolt with a tube and sensor according to one embodiment of the arrangement.
Figure 2:
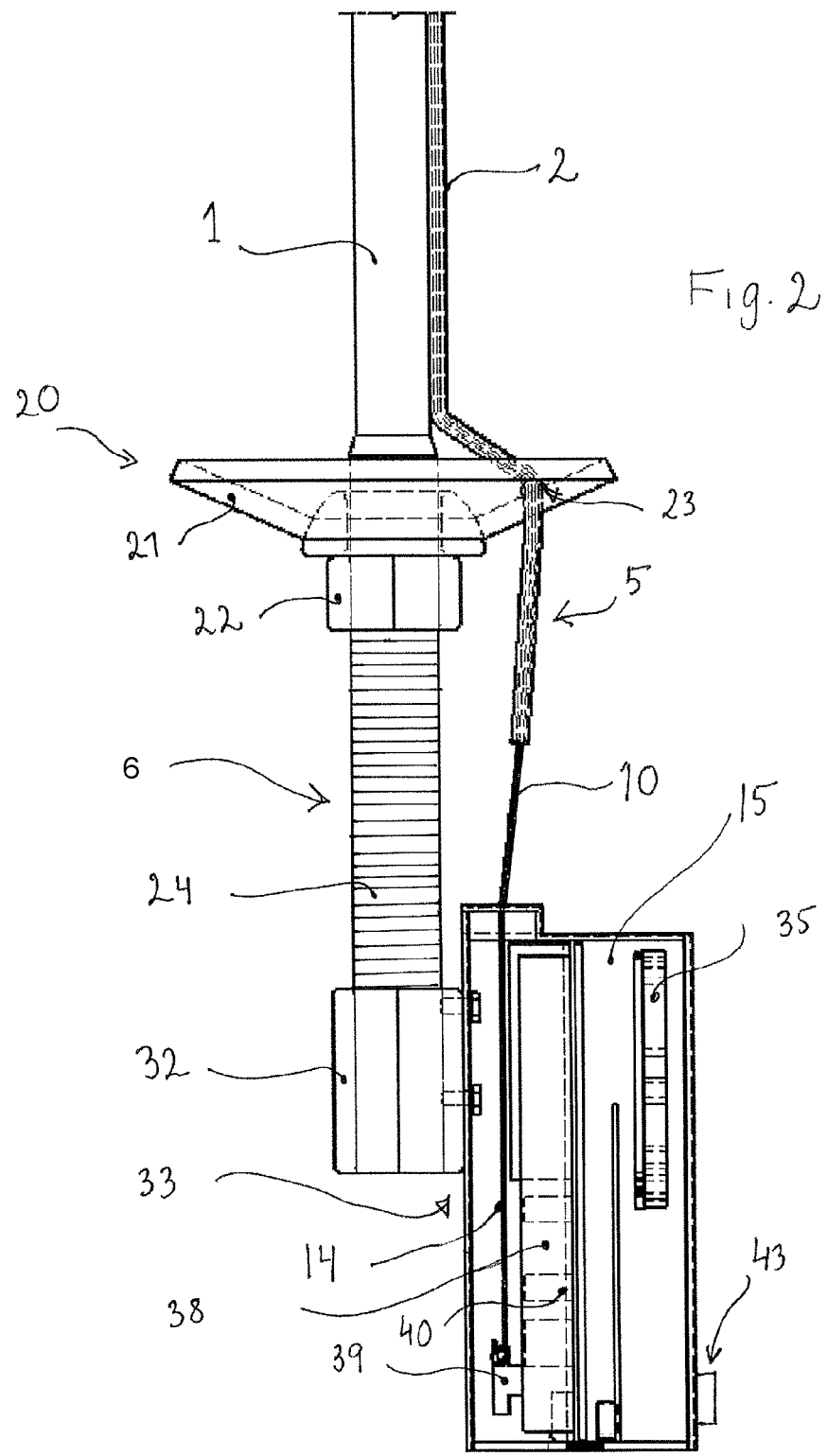
FIG. 2 shows schematically the end of the rock bolt closest to the opening of the borehole with the monitoring arrangement according to the same embodiment as that shown in FIG. 1.

FIGS. 1 and 2 show schematically an embodiment of the arrangement according to the invention. The arrangement according to the invention comprises a rock bolt 1 equipped with a longitudinal tube 2 where the tube has a forward first end 3 arranged at the anchoring end 4 of the rock bolt and a second end 5 arranged at the mounting end 6 of the rock bolt. The tube has a passage 7 and a wall 8 of the tube 2, and is attached at the rock bolt 1 with fastening arrangements 9. The passage 7 extends between the forward end 3 of the tube and the second end 5 of the tube closest to the mounting end 6 of the rock bolt.

The arrangement according to the invention comprises also an extended sensor 10 that is introduced into the passage 7 of the tube. The sensor 10 consists of a thin loop of electrically conducting material such as wire, which may be of piano wire type, that is introduced into the passage 7 of the tube. The sensor 10 has a forward end 11 that is attached at the anchoring end 4 of the rock bolt with a screw joint 12 or similar, in order to form an electrically conducting connection.

The passage 7 of the tube may be sealed at the forward end 3 through melt sealing of the tube in order to prevent grout 13 entering the passage 7. The sensor 10 is designed to be longer than the tube 2 and has a connection end 14 intended to be connected to a monitoring arrangement 15 next to the assembly end 6 of the rock bolt. The sensor 10 can be freely displaced inside of the passage 7 of the tube, and is arranged to be parallel with the rock bolt 1. It can in this way follow changes of the rock bolt. If the rock bolt is bent, therefore, the sensor 10 will react in a corresponding manner and be displaced with the anchoring end 4 of the rock bolt. If the rock bolt 1 breaks as a consequence of increased load in a certain region, also the sensor can, under certain circumstances, break, next to the same region.

Figure 3:
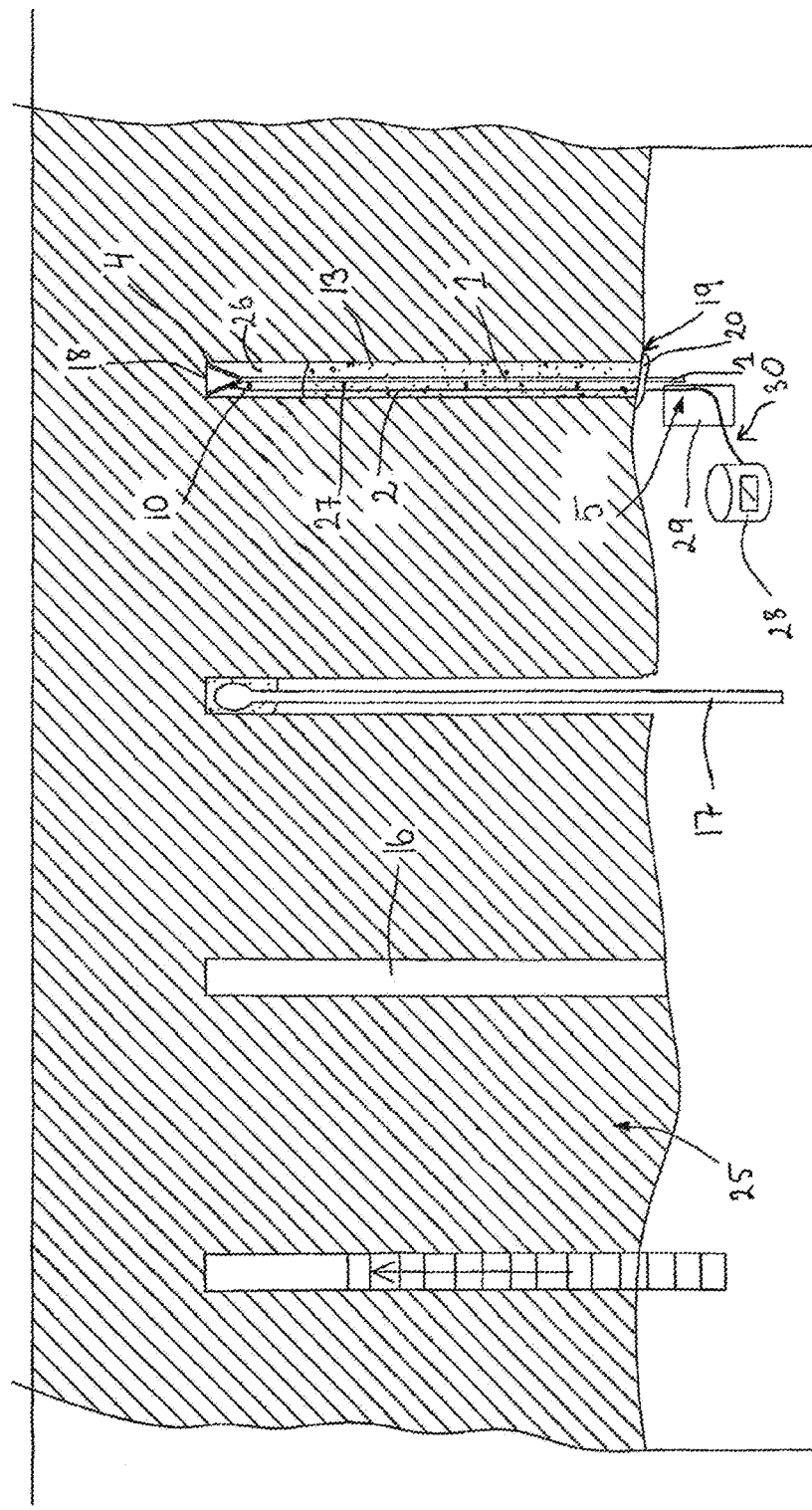
FIGS. 3 a-d show schematically the embedding of a rock bolt comprising a tube in a borehole, and shows schematically the investigation of the presence of a cavity in the borehole.

FIGS. 3 a-d show schematically the embedding of a rock bolt 1 comprising a tube 2 in a borehole 16, through a portion of grout 13 being injected into the borehole 16 by a nozzle 17, normally a tube. The borehole 16 is filled from the bottom 18 of the borehole, after which the tube is withdrawn as filling continues. The rock bolt 1 is subsequently introduced into the borehole.

The arrangement according to the invention is illustrated in FIGS. 1 and 2 in association with a rock bolt 1 of ribbed steel type. The rock bolt 1 may be designed also as a cable bolt or a dynamic rock bolt. One type of dynamic rock bolt (not shown in the drawings) is provided with one or several surrounding sheaths whose task is to prevent the bolt becoming fixed embedded in grout 13 along its complete length. This leads to the ability of the bolt to be bent and extended being exploited, whereby the load-absorbing ability of the bolt increases.

When the bolt 1 with the tube 2 is introduced into the borehole 16, a mounting fitting 20, a washer 21 with a nut 22, is mounted on the protruding assembly end 19 of the rock bolt closes to the borehole 16. It is preferable that the tube 2 be somewhat longer than the rock bolt 1 and protrudes from the borehole 16. The washer 21 of the mounting fitting may be designed with a hole 23 through which the tube 2 with the sensor 10 can be passed.

Rock material 25 may be constituted in different ways: undiscovered cracks 26 and natural cavities are sometimes present that are filled by an injected portion of the grout 13. This means that the portion of grout that has been injected may be insufficient to fix the rock bolt, which may have as its consequence that the reinforcement system of which the bolt is a part is deficient, and has insufficient load-bearing capacity. When the rock bolt 1 with the tube is introduced into what appears to be a filled borehole 16, empty spaces or cavities 26 may arise along the bolt that are difficult to detect. Such a cavity or cavities 26, usually arises or arise, in particular, at the extreme end, at the deepest part of the borehole. There is in this case the risk that the uppermost part of the bolt is not properly anchored by the grout. If this is the case, a part of the load-bearing capacity of the bolt is lost. Furthermore, the risk for corrosion of the bolt increases, since the rock in itself may be wet.

Figure 4:
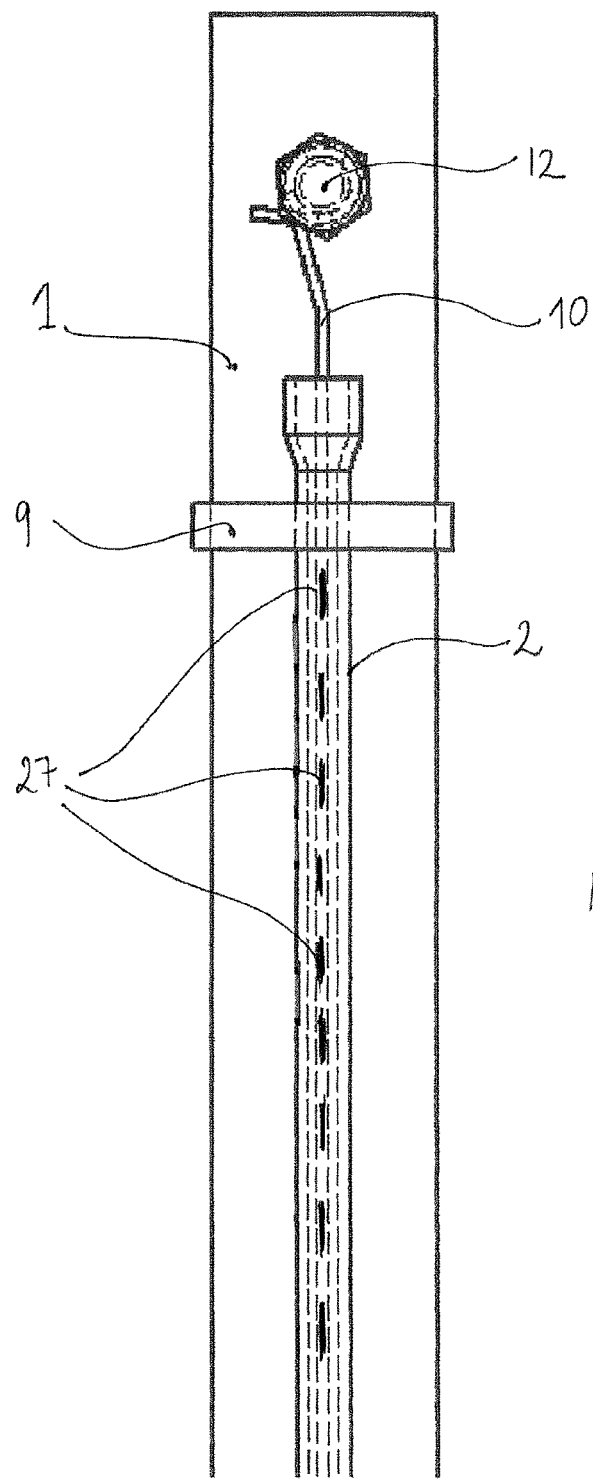
FIG. 4 shows schematically the forward end of a rock bolt with a tube and sensor according to a second embodiment of the arrangement according to the invention.

FIG. 4 shows schematically a further embodiment of the arrangement where the wall 8 of the tube 2 is provided with a set of openings 27, cuts or slits, that can be closed and that are initially closed (see FIG. 4). These can, however, be opened through the supply of medium 30 under pressure to the passage 7 of the tube, in order to detect the presence of a cavity 26 in the borehole. The openings 27 may be distributed along the complete length of the tube, but are primarily distributed over the forward end 3 of the tube next to the anchoring end 4 of the bolt.

If the tube 2 is designed with openings 27 for the investigation of the presence of cavities 26, such an investigation is carried out shortly after the bolt has been introduced into the borehole (schematically illustrated in FIG. 2*d*), in order to determine whether the rock bolt 1 has been correctly embedded and is satisfactorily anchored such that the load-bearing ability of the rock bolt satisfies the desired requirements for load-bearing ability. The investigation concerns primarily the investigation of whether the anchoring end 4 of the rock bolt is well embedded. During the investigation, a medium 30 under pressure is supplied from measuring equipment 28 that has been temporarily connected for this purpose by connection means 29 to the end 5 of the tube that is closest to the opening 19 of the borehole. In the event of a cavity 26 being present in the borehole in direct association with the rock bolt 1 and the tube 2, a change in pressure or a flow of the medium arises that the measuring equipment 28 detects. A fall in pressure or a flow of medium shows that a cavity is present along the rock bolt.

The arrangement according to the invention comprises also a monitoring arrangement that is mounted at the mounting end 6 of the rock bolt. The monitoring arrangement 15 may be designed to be screwed directly onto the thread 24 of the rock bolt with, for example, a nut 32. The monitoring arrangement 15 is mounted at the bolt such that an electrically conducting connection is formed, for example through the nut 32. In cases in which an investigation of the anchoring of the rock bolt at the bottom end of the borehole through measurement of the presence of cavities 26 is carried out, the monitoring arrangement 15 is mounted at the bolt after such an investigation.

Figure 5:
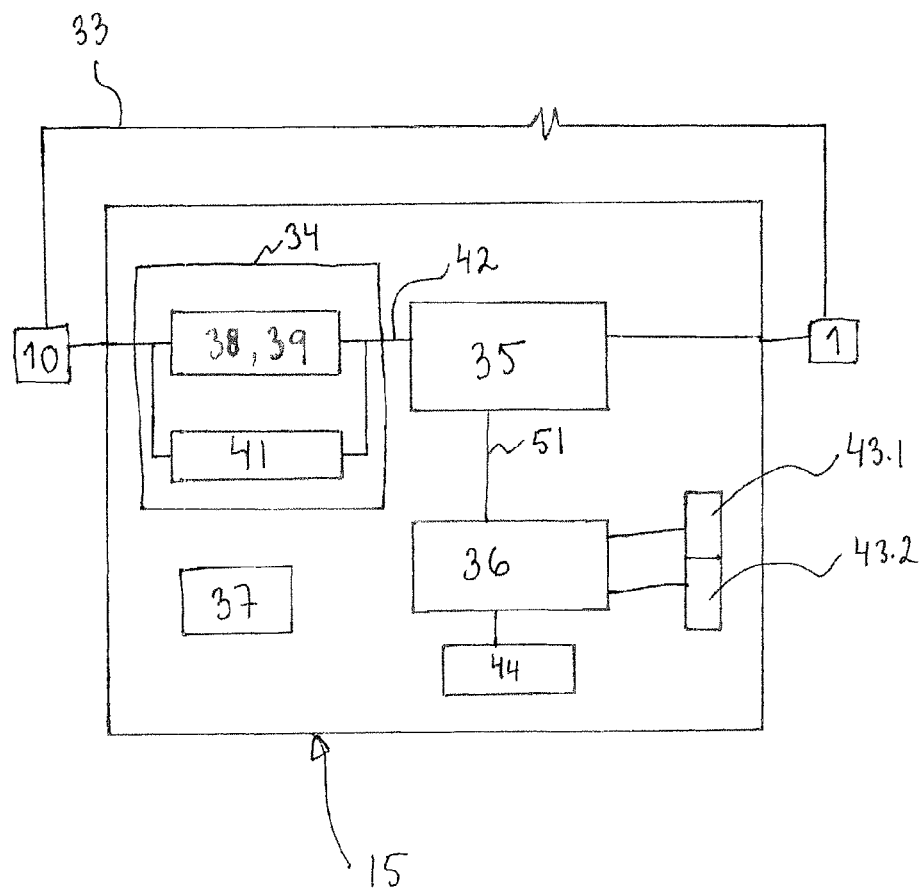
FIG. 5 shows schematically the monitoring arrangement according to one embodiment of the invention.

By connecting the monitoring arrangement 15, the rock bolt 1, and the sensor 10, an electrically conducting closed circuit 33 is formed. FIG. 5 shows one variant of a monitoring arrangement 15 that comprises a detector means 34, an evaluation means 35, a signalling means 36 and a power supply 37.

The detector means 34 is designed for the detection of changes in the position of the sensor 10. The detector means 34 comprises a linear potentiometer or sliding potentiometer 38 equipped with a sliding contact 39 in order to form an electrically conducting connection of the detector means 34 to the connection end 14 of the sensor 10. The sliding contact 39 can be displaced along the contact surface 40 of the potentiometer, along the longitudinal direction of the sensor 10. The position of the sliding contact 39 is represented by a voltage U that will vary between Umin and Umax, depending on the position of the sensor. The detector means 34 is designed such that the sensor 10 can be displace by a maximum of a predetermined, adjustable displacement distance smax, such as approximately 1-2 cm. Since the sensor 10 is fixed to the anchoring end 4 of the rock bolt and to the monitoring arrangement 15, the sensor is influenced in a corresponding manner and will in this way be displaced at the same time as the rock bolt is extended. If the rock bolt is bent and extended, the sensor 10 and the sliding contact 39 are displaced by a corresponding extent, whereby the potentiometer 38 detects a change dU in voltage.

The detector means 34 comprises also means 41 to detect conduction in the electrically conducting circuit 33 that consists of the bolt 1, the monitoring arrangement 15 and the sensor 10. If the circuit 33 is closed, the detector means 34 indicates this to the evaluation means 35. If the rock bolt 1 is subject to breakage, the circuit 33 becomes open. In the event that conduction is lacking, the detector means indicates that breakage of the bolt has taken place.

In the event of displacements in the surrounding rock material 25, forces arise that influence the rock bolt and the sensor 10 that is fixed and connected to the bolt and that runs in the passage 7 of the tube. The rock bolt absorbs the forces and can be deformed, extended and bent through elastic and plastic deformation. The condition of the rock bolt is influenced by this and is changed.

If the rock material 25 is displaced principally in the longitudinal direction of the rock bolt, the bolt is bent and breakage of the bolt occurs when the load-absorbing ability of the bolt is exceeded. Breakage of the bolt opens the circuit 33 and the monitoring arrangement 15 signals this in an appropriate manner. If the rock material 25 around the rock bolt is displaced in the transverse direction, the bolt and the sensor 10 are sheared off in the same region. The sensor can be removed from the tube and measured in order to give an indication of the location of the break.

The monitoring arrangement comprises also an evaluation means 35 designed for the reception and evaluation of signals 42 from the detector means 34. The evaluation means comprises data processors for the processing of incoming signals 42 and the production of output signals 51 with respect to the condition of the bolt and changes in the condition of the signalling means 36.

The signalling means 36 is designed for the signalling of the condition of the bolt, and of changes in its condition.

FIG. 5 shows that the signalling means 36 comprises LEDs 43.1, 43.2 that can emit flashing or steady light signals in different colours. The LEDs are arranged clearly visible on the cover 44 of the monitoring arrangement.

The monitoring arrangement according to FIG. 5 is designed to signal several types of change of condition of the rock bolt. In the case in which the evaluation means detects that the displacement s of the sensor 10 and the sliding contact exceeds the predetermined maximum distance smax, the signalling means 36 indicates this through a flashing yellow LED 43.1 in order to signal that the rock bolt has been bent. In the case in which the evaluation means 35 detects that the circuit 33 has been opened, i.e. that the rock bolt has broken, a red LED 43.2 flashes. The signalling means 36 can, of course, be varied and adapted to different situations.

It is conceivable also that a signal is given if it is detected that the sensor 10 and the sliding contact have been displaced along the contact surface of the potentiometer. It is in this case indicated that the bolt has been bent without breakage of the bolt occurring.

The signalling means may have also a presentation arrangement 44 or a display that shows the condition of the rock bolt.

Figure 6:
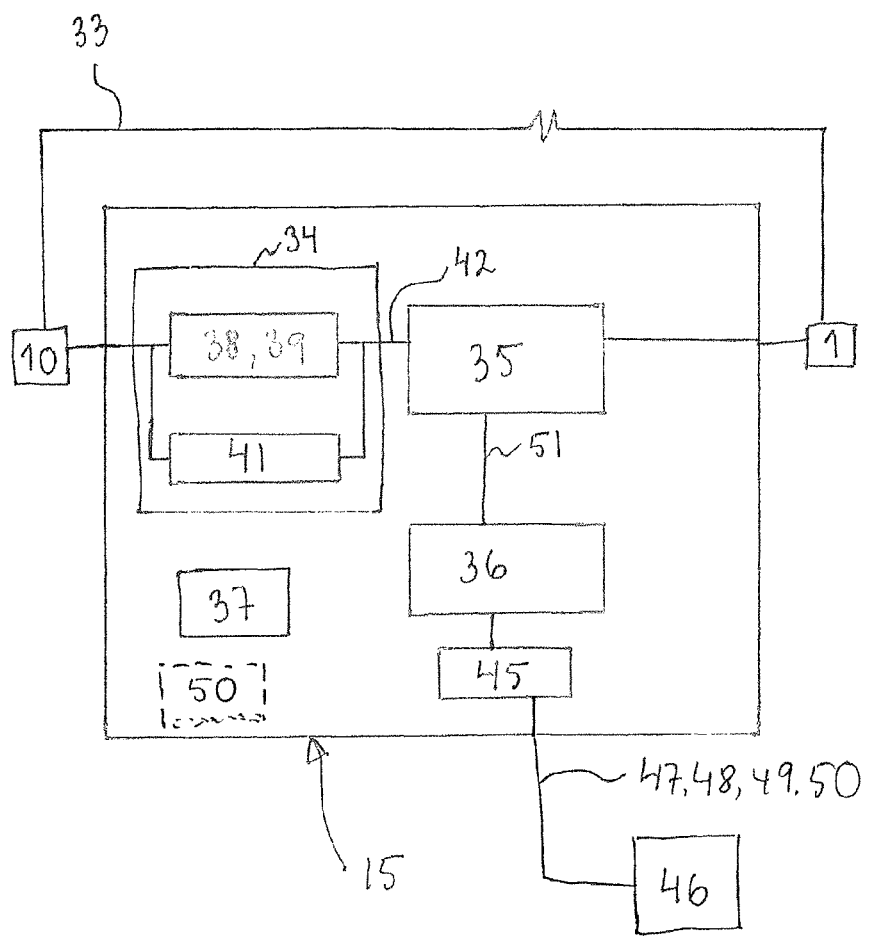
FIG. 6 shows schematically the monitoring arrangement according to one embodiment of the invention.

FIG. 6 shows a further variant of a monitoring arrangement that differs from the previous monitoring arrangement in that the signalling means comprises communication means 45 for the transmission and/or the reception of signals over wireless networks such as WiFi or over mobile networks to/from a central presentation unit 46 arranged at another location that is remote from the rock bolt and the monitoring arrangement 15.

In this variant of the monitoring arrangement 15, the condition of the rock bolt is communicated to the centrally located presentation unit 46. The evaluation means 35 and the signaling means 36 in this variant emit an output signal 47 that indicates whether the circuit 33 is closed or open, i.e. whether the rock bolt is unbroken or broken. Furthermore, the evaluation means 35 may emit an output signal 48 that indicates whether the bolt has become bent or not. The evaluation means 35 may emit also a further output signal 49 that specifies the analogue voltage U of the potentiometer. Since the voltage U varies with the degree of straining e of the bolt, the amount by which the rock bolt has been strained inside the rock is obtained directly. It is preferable that the evaluation means 35 evaluates these incoming signals several times per second and transmits the output signals through the signaling means 36 and a wireless network to the centrally located presentation unit.

It is preferable that the monitoring arrangement 15 has its own power supply 37, for example through batteries of button cell type, in order to power the monitoring arrangement. Furthermore, the monitoring arrangement has a compact design in order to facilitate its handling and mounting. Furthermore, the manufacturing costs are low.

In a further embodiment of the arrangement, also other detectors, such as a smoke detector 50 or other appropriate sensors, may be connected to the monitoring arrangement 15 in order to monitor the presence of smoke in the tunnel or mine.

A further advantage of the monitoring arrangement is that it is possible to reuse it, since it is mounted at the mounting end of the rock bolt and the connection end of the sensor in a manner that allows it to be removed.

The invention claimed is:

1. An arrangement for a rock bolt that is intended to be embedded in grout in a borehole, where the rock bolt is equipped with a longitudinal tube with a passage, the arrangement comprising:
   an extended electrically conducting sensor that is introduced into the passage of the tube, wherein the sensor is connected with an anchoring end of the rock bolt to form an electrically conductive connection,
   a monitoring arrangement comprising a power supply, wherein the monitoring arrangement is designed to be connected to the rock bolt and mounted at a mounting end of the rock bolt to form an electrically conductive connection with the rock bolt, and
   an electrically conducting circuit comprising the electrically conducting sensor, the rock bolt, and the monitoring arrangement formed through the connection of the rock bolt, the sensor and the monitoring arrangement,
   wherein the monitoring arrangement comprises evaluation means configured to evaluate the presence of changes in a condition of the rock bolt, detection means configured to detect conduction in the electrically conducting circuit, and signaling means configured to signal the condition of the bolt, and
   wherein the detection means is configured to detect whether the electrically conducting circuit is closed.

2. The arrangement for a rock bolt according to claim 1, where the tube has a wall provided with penetrating openings for the detection of the presence of a cavity.

3. The arrangement for a rock bolt according to claim 1, where the monitoring arrangement is designed to be mounted at the mounting end of the rock bolt.

4. The arrangement for a rock bolt according to claim 1, wherein the detection means is configured to detect changes of position of the sensor.

5. The arrangement for a rock bolt according to claim 1, where the detection means comprises a sliding potentiometer equipped with a sliding contact, whereby the sensor is connected to the sliding contact.

6. The arrangement for a rock bolt according to claim 1, where the sensor comprises a thread or wire.

7. The arrangement for a rock bolt according to claim 1, where the signaling means comprises LEDs arranged on a cover of the monitoring arrangement.

8. The arrangement for a rock bolt according to claim 1, where the signaling means comprises communication means for the transmission and/or reception of signals over wireless networks or mobile phone networks to a central presentation unit.

9. The arrangement for a rock bolt according to claim 1, where the monitoring arrangement is designed to be removably mounted at the mounting end of the rock bolt.

10. The arrangement for a rock bolt according to claim 1, where the rock bolt is designed as a dynamic rock bolt comprising a surrounding sheath along part of the rock bolt.

11. The arrangement for a rock bolt according to claim 1, where the monitoring arrangement comprises a smoke detector.

12. A method for using the arrangement according to claim 1, comprising the steps:
    introducing the sensor into the tube fixed at the rock bolt,
    connecting the sensor to the anchoring end of the rock bolt,
    introducing the rock bolt into the borehole filled with grout,
    connecting the monitoring arrangement to the rock bolt,
    connecting the rock bolt, the sensor and the monitoring arrangement in order to form the electrically conducting circuit, and
    evaluating the occurrence of changes in the condition of the rock bolt by the evaluation means,
    detecting the conduction in the circuit by the detection means, and
    signaling the condition of the rock bolt by the signaling means.

13. The method according to claim 12, comprising the step of detecting the presence of a cavity through a supply of medium under pressure to the tube and detecting change of pressure in the medium or a flow of medium.

14. The method according to claim 12, comprising detecting changes of position of the sensor.

15. The method according to claim 12, comprising signaling when strain/elongation of the rock bolt is detected.

16. The method according to claim 12, comprising signaling when the change of position of the sensor exceeds a predetermined maximum displacement distance.

17. The method according to claim 12, comprising detecting the conduction in the circuit, where the lack of conduction indicates breakage of the bolt.

18. The method according to claim 12, comprising signaling by the signaling means when breakage of the rock bolt is detected.

19. The method according to claim 12, where the signaling comprises emitting flashing and/or steady light signals at LEDs arranged on a cover of the monitoring arrangement.

20. The method according to claim 12, where the signaling comprises the transmission and/or reception of signals over wireless WiFi networks or mobile phone networks to a central presentation unit.

21. A rock reinforcement system comprising a set of several rock bolts where each one of the bolts is equipped with an arrangement according to claim 1.

* * * * *